United States Patent
Kalita et al.

(10) Patent No.: US 9,105,012 B2
(45) Date of Patent: Aug. 11, 2015

(54) PROVIDING CUSTOMIZED INFORMATION FOR MOBILE DEVICES AND EFFICIENTLY SEARCHING THE SAME

(71) Applicant: Verizon Patent and Licensing Inc., Basking Ridge, NJ (US)

(72) Inventors: Samantha Kalita, Boston, MA (US); Graham David Sysko, Cambridge, MA (US); Hannah Y. Moon, Boston, MA (US); Hilary Basch, Brighton, MA (US); Tiffany Chan, Weston, MA (US); Sankar Shanmugam, Dayton, NJ (US); Rosa Tavares, Holmdel, NJ (US); Arindam Mitra, Duluth, GA (US); Swapnil Mahankal, Bedminster, NJ (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 223 days.

(21) Appl. No.: 13/731,855

(22) Filed: Dec. 31, 2012

(65) Prior Publication Data
US 2014/0188932 A1  Jul. 3, 2014

(51) Int. Cl.
*G09B 19/00* (2006.01)
*G06Q 10/10* (2012.01)
*H04M 15/00* (2006.01)

(52) U.S. Cl.
CPC ............ *G06Q 10/10* (2013.01); *G09B 19/0053* (2013.01); *H04M 15/58* (2013.01)

(58) Field of Classification Search
CPC .................................................. G09B 19/0053
See application file for complete search history.

(56) References Cited

U.S. PATENT DOCUMENTS

| | | | |
|---|---|---|---|
| 5,193,178 A * | 3/1993 | Chillarege et al. | 714/25 |
| 6,813,587 B2 * | 11/2004 | McIntyre et al. | 702/183 |
| 2010/0295696 A1 * | 11/2010 | Chu et al. | 340/686.1 |
| 2012/0084216 A1 * | 4/2012 | Williamson | 705/302 |

OTHER PUBLICATIONS

Welcome to Small Business Support, Captured Oct. 24, 2010 per archive.org, Internet archive, https://web.archive.org/web/20101024062904/http://support.dell.com/support/index.aspx?~ck=pn.*
Dell Technical Support Home Page, Captured Oct. 31, 2010 per archive.org, Internet archive, https://web.archive.org/web/20101031175643/http://support.dell.com/support/DPP/Index.aspx?c=us&cs=04&l=en&s=bsd.*
Dell Latitude D600, 2003, Dell Inc., http://www.dell.com/downloads/global/products/latit/en/spec_latit_d600_en.pdf.*

(Continued)

*Primary Examiner* — Jason Liao (57) ABSTRACT

Account information associated with a mobile device is obtained through a mobile wireless communication network from a database of subscriber account records for mobile wireless communication service subscribers. The account information may identify the previous mobile device, the mobile device, and/or length of usage of the mobile device. Advice information is selected from a database of advice regarding operation of the mobile devices such that the selected advice information is adapted for the account, and the selected advice information is then provided via a user interface element of the mobile device. Additionally, multiple levels of search related phrases, in which the phrases at each level correspond to a user-selected phrase at the previous level, are presented via a user element of a mobile device.

20 Claims, 6 Drawing Sheets

(56) References Cited

OTHER PUBLICATIONS

Warranty detalis for your Latitude D600, captured Oct. 3, 2014, Dell Inc., http://www.dell.com/support/home/us/en/19/product-support/servicetag/4J31X51/diagnose?s=BSD.*

Product Support captured Oct. 3, 2014, Dell Inc., http://www.dell.com/support/home/us/en/19/product-support/servicetag/4J31X51/drivers?s=BSD.*

Get DELL Warranty Information from support.dell.com with entry dated by Feb. 18, 2011, commandlinefu.com, http://www.commandlinefu.com/commands/view/7926/get-dell-warranty-information-from-support.dell.com.*

Technology Inventory FAQ, date unknown, hardemancountryschools.com, http://www.hardemancountyschools.org/technology/inventory.html.*

Gibbs, I've got a suggestion Dec. 10, 2004, blogspot.com, http://googleblog.blogspot.com/2004/12/ive-got-suggestion.html.*

\* cited by examiner

PROVIDING CUSTOMIZED INFORMATION FOR MOBILE DEVICES AND EFFICIENTLY SEARCHING THE SAME

BACKGROUND

In recent years, the use of mobile devices such as smart phones, tablets or the like, has rapidly expanded. Features that are available on such mobile devices have also increased in variety and complexity. In addition, the product cycles for the mobile devices are becoming increasingly shorter, prompting the users to replace their mobile devices with new ones more frequently. Application programs or other types of programming such as widgets have been developed which provide help information (e.g., how to utilize the various features that are available on mobile devices) related to mobile devices to the users. Such help information would be organized according to various topics, and a user would look for help information that most closely relates to the topic that is of current interest to the user. The organization of such help information is thus static, and the information is provided in the same manner regardless of the user's length of ownership of or familiarity with, the mobile device.

However, as the features available on the mobile devices have increased in number and have become more complex, it has become increasingly difficult and inefficient for the users to find the right information for their needs. Hence, a need exists for providing information that is customized for each user's specific needs, and a method for allowing each user to search for needed information more efficiently.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein relate to technologies for providing information related to a mobile device to a user. For example, programming such as an information widget may be configured to provide the user with advice information associated with a mobile device, such as help information or tip information for utilizing the mobile device. A widget refers to programming that is configured to perform relatively simple functions, such as displaying information. In an exemplary implementation, the widget may be configured such that providing a user input on the displayed information (e.g., tapping on the displayed information) may execute an application that is configured to perform a more complex functions for the displayed information. The widget may be incorporated as part of a user interface of an operating system or may be implemented as a standalone application.

The type of information provided through the information widget and the presentation of such information is customized based on, for example, account information of an account associated with the mobile device (e.g., a user profile associated with the account; or historical device information associated with the account such as information on the previous mobile device, current mobile device, or length of use of the current mobile device, for the account), or mobile device events (e.g., battery level reaching a certain level, or available memory space reaching a certain level). For example, a user who is new to a smartphone may be presented with basic tips for setting up the smartphone, whereas a more experienced user may be presented with tips on more advanced features. As another example, the user may be provided with tips on conserving battery life if the battery level of the mobile device becomes low. Whether the different types of information are presented as text or video may also be customized based on the account information. The account information may be stored at an account information database that is managed by a carrier or a service provider providing mobile communications services to the user's mobile device. In addition to, or alternatively, at least some of the account information (e.g., user profile for a user associated with the account) may also be stored at the mobile device.

In an example, initially, different mobile devices associated with different accounts may be preloaded with predetermined set of information that applies generally to all accounts and mobile devices. Then, a server (e.g., an application server managed by the carrier) may periodically update the information widget on each mobile device with new information that is customized based on the account information associated with each of the mobile devices. Therefore, as time progresses, users of the different mobile devices are each provided with different, customized information that is adapted for the account of the mobile device, through the information widget. The information widget may also be updated with customized information when a predetermined mobile device event occurs (e.g., battery level reaches below a predetermined level). In this example, the information for providing to the mobile devices through the information widget is stored in an information database that is in communication with the server. When updating the information widget a mobile device with customized information, the server may select information from the information database based on the account information associated with the mobile device so as to provide information that is customized for the account of the mobile device. An interface may also be provided through which administrators may enter new information that may be provided through the information widget, into the information database.

Information displayed on the information widget as described above may not display all the information that a user of a mobile device needs at a given time. An information navigation feature may be provided such that the user may find additional information that he or she is looking for, more efficiently. The information navigation feature may be provided through the information widget, or through a separate application. Questions that the user may seek answers to are broken down into different pieces, and are provided for user selection in a series of steps. At each step, the user selects a different piece of a sentence such that the user puts together a complete sentence after going through all the steps.

The options that are provided for user selection at each step are dependent on what the user selected in the previous step. For example, in the first step, the user may select a question type, such as "What is . . . ," "How do I . . . " or "There is an issue with my . . . ." In the second step, the options that are presented to the user for selection changes based on the selection in the first step. If the user selected "What is . . . " in the first step, the user may be prompted to select a subject of the question. For example, the user may be provided with a list of items or terms that the user may inquire about. If the user selected "How do I . . . " in the first step, in the second step the user may be prompted to select an action associated with the question. For example, the user may be provided with a list of different types of actions that the user may wish to perform. In this case, a third step may be provided for selecting the subject of the action. The options that are presented to the user at each step may also be determined based on account information associated with the mobile device and/or mobile device events.

After the user goes through each step and completes a question, the help navigation feature may provide the user with an answer to the question. Since a question is assembled through different steps that are dependent their previous steps, the user is able to identify the question that he or she is seeking the answer to, more efficiently.

Figure 1:
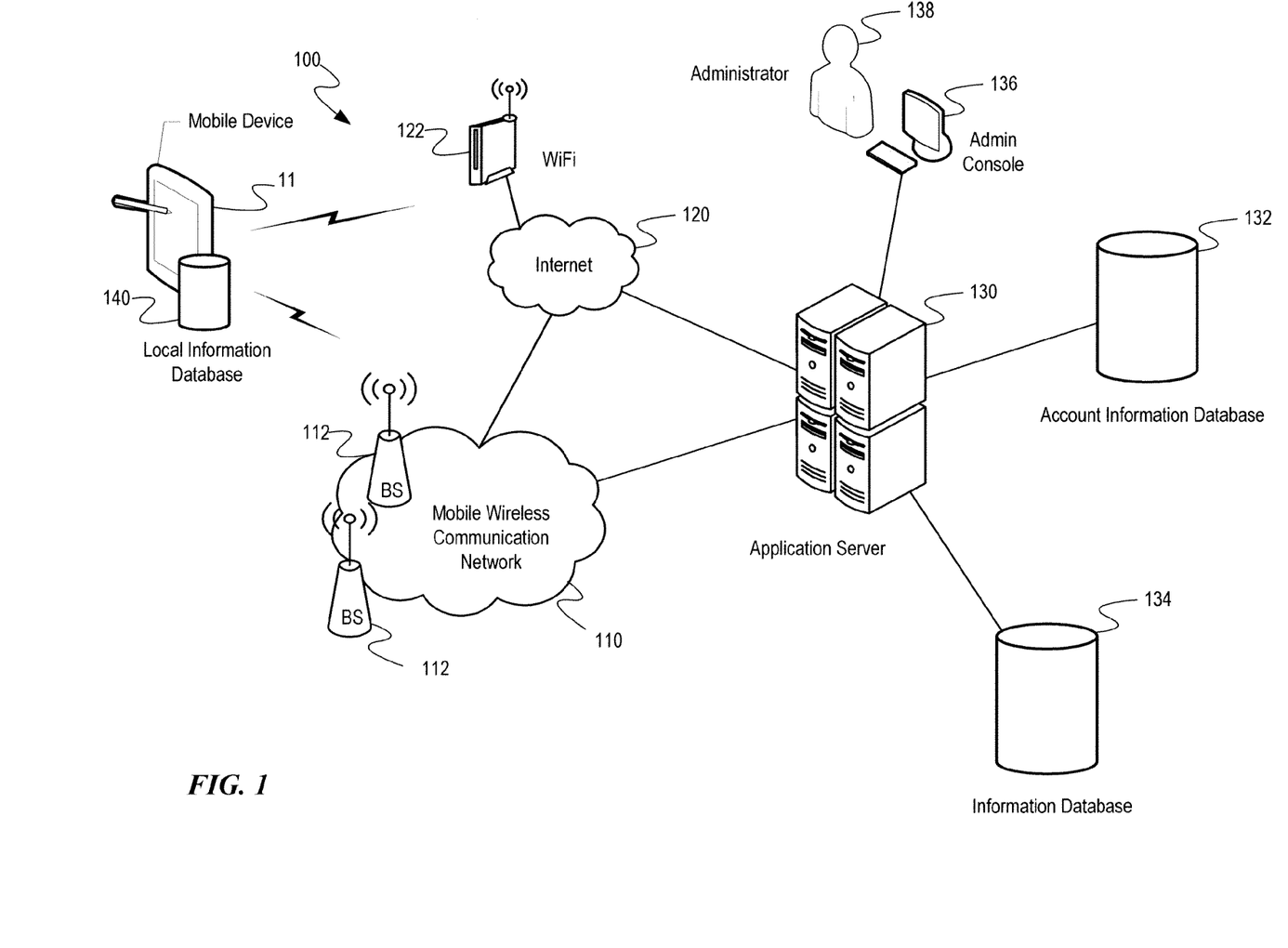
FIG. 1 is a high-level functional block diagram of an example of a system of networks/devices that provide various communications for mobile devices, for example, for providing customized information and allowing a user to search for information, regarding operation of mobile devices.

Reference now is made in detail to the examples illustrated in the accompanying drawings and discussed below. FIG. 1 illustrates a system 100 offering a variety of mobile communication services, including communications for providing customized information and allowing users to search for information, regarding operation of mobile devices.

The example shows simply one mobile device 11 as well as a mobile wireless communication network 110. The mobile device 11 is a smart phone type device, in this case that utilizes a touch screen for the user interface. The network 110 provides mobile wireless communications services to mobile devices including device 11, for example, via a number of base stations (BSs) 112 of the network 110. The present techniques may be implemented in any of a variety of available mobile networks 110 and/or on any type of mobile device compatible with such a network 110, and the drawing shows only a very simplified example of a few relevant elements of the network 110 for purposes of discussion here. Although only the one user's device 11 is shown, the network 110 will provide various communications for many other similar users and their various devices as well as for mobile devices/users that do not participate in the communications related to the information widget and the information navigation feature under consideration here.

The mobile wireless communication network 110 may be implemented as a network conforming to any of the applicable standards for public mobile wireless communications, examples of which include, but are not limited to, Code Division Multiple Access (CDMA) and 3rd Generation Partnership Project (3GPP) network technologies including, for example and without limitation, 3GPP type 2 (or 3GPP2) and 3GPP Long Term Evolution (LTE), at times referred to as "4G."

Many of the mobile devices served by network 110, including device 11 in our example, are capable of voice telephone communications through the network 110, various types of mobile messaging service communication and mobile data communications. Although the messaging service transport could be used, the exemplary device 11 will typically utilize data communications through the particular type of network 110 for the communications related to providing customized information through the information widget and searching for information using the information navigation feature; and such a device 11 typically will be associated with an account for a subscription to data service through the network 110.

In general, the network 110 offers users of the mobile devices such as device 11 (and other mobile devices not shown) IP data transport for a variety of data services, e.g. via the Internet 120, such as downloads, web browsing, email, etc. Such communications may be with other mobile devices, various other types of user terminals and/or computers configured as servers.

In this example, system 100 also includes an application server 130 which communicates with the mobile device 11, through the network 110 and/or the internet 120, for providing customized information related to the mobile device 11 to the user of the mobile device 11, and allowing the user to search for information related to the mobile device 11. The application server 130 may be managed by the carrier providing the mobile communications services to the mobile device 11 through the network 110 and/or the Internet 120. For providing customized information and allowing users to search for information, the drawing shows that application server 130 is connected with two example databases, which are also managed by the carrier providing the mobile communications services to the mobile device 11.

The database 132 is an account information database. An example of an account information database is a Virtual Information System Integrated Online Network (VISION) database, which includes account information such as subscriber account records for accounts of subscribers of the carrier providing the mobile communications services to the mobile device 11. Types of information that are included in the subscriber account records include, for example, historical device information such as information on current mobile device, previous mobile device(s), that is or were associated with an account for a subscriber. The subscriber account records may also include information on how long the current mobile device and/or each of the previous mobile device(s) has been associated with the account. The subscriber account records may further include profiles of users that are associated with the account. An account of a subscriber may be associated with one or more users, each user being associated with different mobile devices that may be registered under the subscriber's account. Each user's profile may include information such as the user's preferences (e.g., preferred method of displaying information through the information widget, preferred method of contact, user's topic of interest, preferred language, etc.) that the user may have provided to the carrier or that the carrier may have collected with user's authorization. The subscriber account records may also include the other types of information related to the account such as, for example, the subscriber's phone number, address, and subscription information such as the type of voice plan and/or data plan the subscriber has with the carrier, or contract start/end date.

The application server 130 executes programming that obtains the account information from the account information database 132, and provides information related to the mobile devices 11 such as advice information for utilizing the mobile device 11 (e.g., help information or tip) that is customized for the user of the mobile device 11, based on the obtained account information.

The database 134 is an information database. The information database 134 stores the information that may be provided by the application server 130 to the mobile device 11. Such information may include, for example, advice information such as help information or tip regarding operation of the mobile device 11. As one example, the help information may be a text or video explaining to the user of the mobile device 11 how to utilize key features of the mobile device 11. Authorized persons, such as administrators at the carrier providing the mobile communications services to the mobile device 11 may add the help information or tip into the information database 134 such that the application server 130 may provide the entered information to the mobile device 11, based on the subscriber account records obtained from the account information database 132. The drawing shows an admin console 136 that an administrator 138 may use for entering the help information or tip into the information database 134, in this example. The administrator 138 may be the administrator of the carrier, or other administrators authorized by the carrier to enter the help information or tip. An authentication system may be provided through the admin console 136 such that the administrators 138 may provide credentials to authenticate themselves as being authorized to enter the help information or tip.

The various functions described herein as being performed by the administrator 138 may also be performed automatically, for example, based on predefined rules stored in the databases 132 and/or 134.

The admin console 136 may be a user interface for entering the help information or tip provided by programming executed at the application server 130, or a separate system in communication with the application server 130 and/or the information database 134, executing programming which provides the user interface. Through the admin console 136, the administrator 138 may enter the help information or tip, and may also specify criteria under which the entered help information or tip is intended to be provided to the user of the mobile device 11. For example, the administrator 138 may specify that a piece of help information or tip is intended for a user who has recently switched from a certain model to another model. Such criteria is stored at the information database 134 such that the programming for providing the help information or tip to the mobile device 11 executed at the application server 130 may make determinations for providing the help information or tip based on the criteria.

To insure that the communication between the mobile devices and the application server 130 for providing customized information and allowing the users to search for information is available on a virtually continuous uninterrupted basis for many similar users/devices, each of the application server 130, the account information database 132, and the information database 134 are typically implemented on many similar platforms on a distributed basis. Further, the server 130, and the databases 132 and 134 may be connected among each other via the network 110 and/or the Internet 120.

A local information database 140 may also be provided. In this example, the local information 140 is implemented as part of the mobile device 11, and will be discussed in more detail below with respect to FIG. 2. The local information database 140 may store advice information such as help information or tip for utilizing the mobile device 11, that are preloaded when the mobile device 11 is newly purchased. The local information database 140 may also store the customized advice information that is received from the application server 130.

The mobile device 11 may be capable of WiFi communication as well as or instead of mobile wireless communication via a network like the illustrated network 110. Hence, for discussion purposes, the drawing also shows a WiFi access point 122 connected to the Internet 120.

The WiFi access point 122 may be a hotspot in a public or commercial venue, which provides Internet access within the vicinity; or the WiFi access point 122 may be secured to provide private access in a home, an office, on a campus, or the like. The access point 122 provides WiFi enabled devices like mobile device 11 with wireless IP packet data communication, in this case, for access to the Internet 122. When available, communications providing customized information and allowing the users to search for information with the application server 130 may utilize WiFi instead of mobile wireless communications through the network 110.

Figure 2:
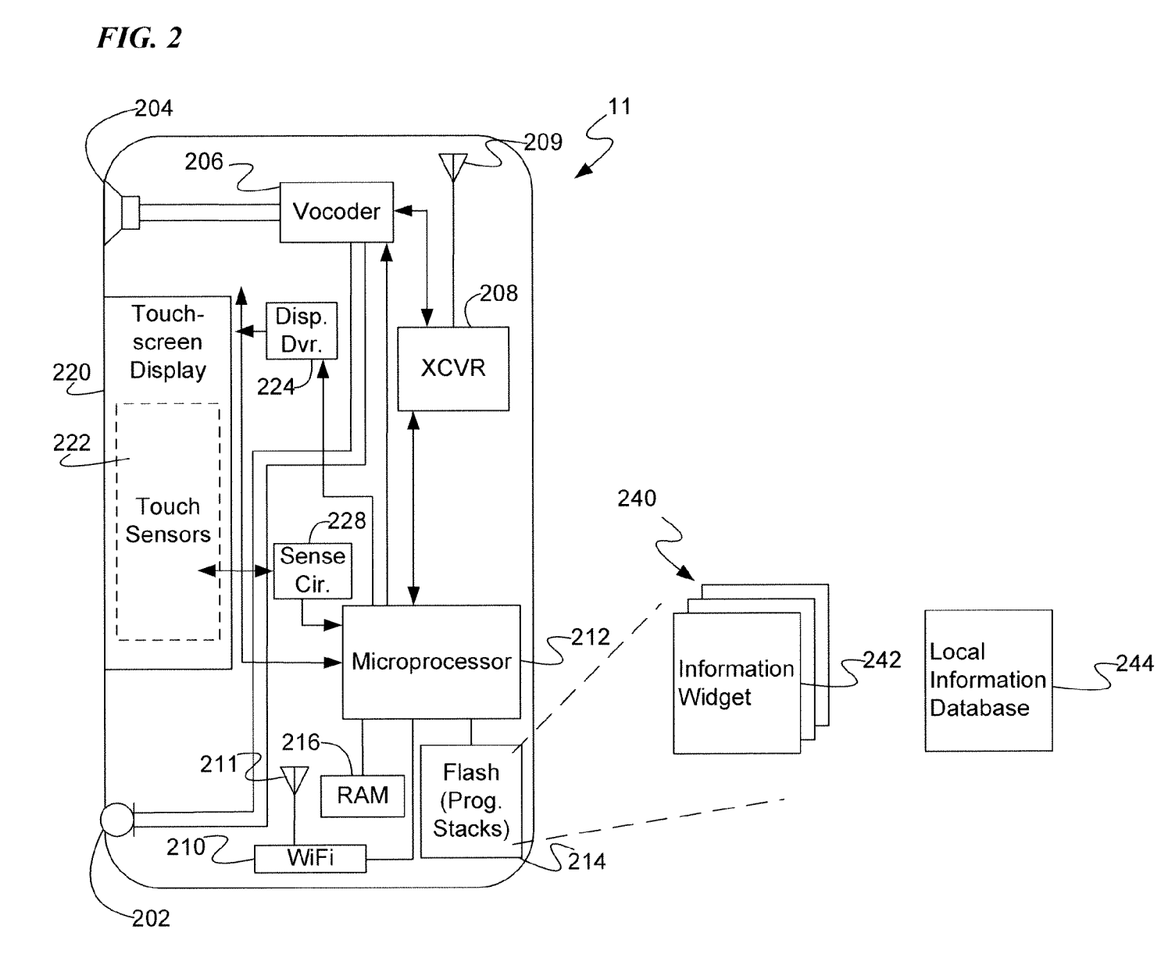
FIG. 2 is a high-level functional block diagram of an exemplary mobile device.

FIG. 2 illustrates an example of the mobile device 11. FIG. 2 illustrates elements of the mobile device 11 in functional block diagram form, at a relatively high level.

It should be appreciated that the disclosed subject matter may be implemented using any mobile computing device having computing capability and mobile communication capability, configured to use those capabilities to conduct operations such as, for example, providing customized information to the user and allowing the user to search for information, regarding operation of the mobile device 11, as discussed herein. In the example of FIG. 2, the mobile device 11 is in the form of a smart phone type mobile handset including a touch screen display. Examples of touch screen type mobile devices that may be used to implement mobile device 11 may include, but are not limited to, a smart phone, personal digital assistant (PDA), tablet computer or other portable device with mobile communication capability. However, the structure and operation of the touch screen type mobile device 11 is provided by way of example; and the subject technology as described herein is not intended to be limited thereto. For purposes of this discussion, FIG. 2 provides a block diagram illustration of the exemplary mobile device 11 having a touch screen display for displaying content and receiving user input as or as part of the user interface.

Although the operations that are the focus of discussions here will utilize data communications, a typical mobile device such as the exemplary smart phone 11, will also support voice communications. Hence, in the example shown in FIG. 2, mobile device 11 includes a microphone 202 for audio signal input and a speaker 204 for audio signal output. The microphone 202 and speaker 204 are communicatively coupled to a voice or audio encoder/decoder (vocoder) 206. For a voice telephone call, for example, the vocoder 206 provides two-way conversion between analog audio signals representing speech or other audio and digital samples at a compressed bit rate compatible with the digital protocol of wireless telephone network communications or voice over packet (Internet Protocol) communications. The vocoder, speaker and microphone may also be used as elements of the user interface during other operations of the device, including some types of data communications.

Also, as shown in FIG. 2, the mobile device 11 includes at least one digital transceiver (XCVR) 208, for digital wireless communications via a wide area mobile wireless communication network, although the mobile device 11 may include additional digital or analog transceivers (not shown). The transceiver 208 conforms to one or more of the various digital wireless communication standards utilized by modern mobile networks. Examples of such transceivers include, but are not limited to transceivers configured to operate in accordance with Code Division Multiple Access (CDMA) and 3rd Generation Partnership Project (3GPP) network technologies including, for example and without limitation, 3GPP type 2 (or 3GPP2) and 3GPP Long Term Evolution (LTE), at times referred to as "4G." In an example, transceiver 208 provides two-way wireless communication of information including, digitized audio signals, still image and/or video signals, web page information for display as well as web related inputs, and various types of mobile message communications to/from the device.

Several of these types of communications through the transceiver and a network, as discussed later, will relate to providing customized information to the user and allowing the user to search for information, related to the mobile device 11, for example, in an implementation in which customized information related to the mobile device 11 is communicated from the application server 130 to the mobile device 11, and is provided to the user through the information widget executed at the mobile device 11. Communications related to providing customized information to the user and allowing the user to search for information related to the mobile device, for example, will often utilize Internet Protocol (IP) packet data transport utilizing the digital wireless transceiver (XCVR) 208 and over the air communications to and from base stations of the serving mobile network. Such communications may include specific mobile device application related data as may include related text, image, video and/or audio information.

Transceiver 208 also sends and receives a variety of signaling messages in support of various voice and data services provided by a network of a wireless service provider, to a user of mobile device 11 via the mobile communication network. Transceiver 208 connects through radio frequency (RF) send-and-receive amplifiers (not separately shown) to an antenna 209. Transceiver 208 may also support various types of mobile messaging services, such as short message service (SMS), enhanced messaging service (EMS) and/or multimedia messaging service (MMS). Although data communications involving mobile device application related data typically utilize IP data transport, such data communications may at times utilize one or more of these mobile messaging services for the data transport through the mobile communication network.

Many modern mobile devices also support wireless local area network communications over WiFi, instead of or in addition to data communications using the wide area mobile communication network. Hence, in the example of FIG. 2, for packet data communications, the exemplary device 11 also includes a WiFi transceiver 210 and associated antenna 211. Although WiFi is used here as the example, the transceiver 210 may take the form of any available two-way wireless local area network transceiver of a type that is compatible with one or more standard protocols of communication implemented in wireless local area networks, such as one of the WiFi standards under IEEE 802.11 and/or WiMAX. The transceiver 210, for example, may provide two-way data transport for wireless communication with a wireless access point in a residence or enterprise that the user frequents or with any available hotspot offered in a public venue. Although communicating through a different network or networks, the transceiver 210 supports various types of data communications similar to the packet data communications supported via the mobile network transceiver 208, including communications that may relate to providing customized information to the user and allowing the user to search for information related to the mobile device.

WiFi, as in the illustrated example, has been widely adopted for wireless local area network communications, e.g. currently over distances of up to about 100 meters or so. Although this range is somewhat shorter than that available from mobile networks via the transceiver 208, the wireless local area network communications typically incur no or lower data usage charges than the communications via the transceiver 208 using the mobile network.

Mobile device 11 further includes a microprocessor (or "processor") 212, which serves as a programmable controller for mobile device 11 by configuring mobile device 11 to perform various operations, for example, in accordance with instructions or programming executable by processor 212. Such operations may include, for example, various general operations of mobile device 210 as well as operations implemented by execution of various applications that have been installed on the mobile device 11. For purposes of the present discussion, the mobile device operations implemented by processor execution of appropriate programming also include operations related to providing customized information to the user and allowing the user to search for information regarding operation of the mobile device, and related operations as described herein.

A flash memory 214 is used to store, for example, programming or instructions such as the information widget, for execution by the processor 212. Depending on the type of device, the mobile device 11 will store and run an operating system through which the mobile device applications may be run on the device. Examples of operating systems include Android, Apple iOS (I-Phone or iPad devices), Windows Mobile, RIM BlackBerry operating system, or the like. The programming in the flash memory 214 will also include one or more application programs configured for execution on the processor 212 via or in cooperation with the specific operating system. Flash memory 214 may also be used to store mobile configuration settings for different mobile device applications or services executable at mobile device 11 (using processor 212). Mobile device 11 may also include a non-volatile random access memory (RAM) 216 for a working data processing memory.

Of course, other storage devices or configurations may be added to or substituted for those in the example. Such other storage devices may be implemented using any type of storage medium having computer or processor readable instructions or programming stored therein and may include, for example, any or all of the tangible memory of the computers, processors or the like, or associated modules.

The instructions or programming for the processor, which configure the mobile device 11, include an information widget 242, as described herein. Program aspects of the technology may be thought of as "products" or "articles of manufacture" typically in the form of executable code or process instructions and/or associated data, e.g. for the information widget, that is stored on or embodied in a type of machine or processor readable medium.

A mobile device under consideration here may include a variety of different types of user interface elements. For discussion purposes, in the smart phone example shown in FIG. 1, the user interface elements of mobile device 11 include a touch screen display 220 (also referred to herein as "touch screen 220" or "display 220"). For output purposes, the touch screen 220 will include a display screen, such as a liquid crystal display (LCD) or the like. For input purposes, touch screen display 220 includes a plurality of touch sensors 222.

Other interface elements may include a keypad including one or more keys 230. For example, the keypad may be implemented in hardware as a T9 or QWERTY keyboard of mobile device 11 and keys 230 may correspond to the physical keys of such a keyboard. Alternatively, keys 230 (and keyboard) of mobile device 11 may be implemented as "soft keys" of a virtual keyboard graphically represented in an appropriate arrangement via touch screen display 220. The soft keys presented on the touch screen display 220 may allow the user of mobile device 11 to invoke the same user interface functions as with the physical hardware keys. In some implementations, the microphone 202 and speaker 204 may be used as additional user interface elements, for audio input and output, including with respect to some functions related to providing customized information to the user and allowing the user to search for information regarding operation of the mobile device, as described herein.

For output, touch screen display 220 is used to present information (e.g., text, video, graphics or other visible content) to the user of mobile device 11. Processor 212 controls visible display output on the LCD or other display element of the touch screen display 220 via a display driver 224, to present the various visible outputs to the device user. For example, the information widget may cause the processor 212 to operate the driver 224 to cause screen 220 to display customized information related to the mobile device 11, or provide a user interface for allowing the user to search for information related to the mobile device 11.

In general, touch screen display 220 and touch sensors 222 (and one or more keys 230, if included) are used to provide the textual and graphical user interface for the mobile device 11. In an example, touch screen display 220 provides viewable content to the user at mobile device 11. Touch screen display 220 also enables the user to interact directly with the viewable content provided in the content display area, typically by touching the surface of the screen with a finger or an implement such as a stylus.

As shown in FIG. 2, mobile device 11 also includes a sense circuit 228 coupled to touch sensors 222 for detecting the occurrence and relative location/position of each touch with respect to a content display area of touch screen display 220. In this example, sense circuit 228 is configured to provide processor 212 with touch-position information based on user input received via touch sensors 222. In some implementations, processor 212 is configured to correlate the touch position information to specific content being displayed within the content display area on touch screen display 220. The information tracked by sense circuit 228 is used by processor 212 to detect various points of touching as well as different types of touch gestures, for enabling the processor and thus the device 11 to perform operations in accordance with each touch or touch gesture, including any related to operations or the like with respect providing customized information to the user and allowing the user to search for information related to the mobile device, as described herein.

The logic implemented by the processor of the mobile device 11, in the example, by the microprocessor 212, configures the processor to control various functions as implemented by the mobile device 11. The logic for a processor may be implemented in a variety of ways, but in our example, the processor logic is implemented by programming, such as the information widget, for execution by the microprocessor 212. The programming may take a variety of forms; and depending on the general program architecture, aspects relating to operations performed by the information widget (e.g., providing customized information to the user and allowing the user to search for information related to the mobile device) may be implemented in various ways. For example, the functions for providing customized information to the user and allowing the user to search for information related to the mobile device could be implemented using a special module in the operating system and/or as a standalone application program. The example configures the processor so that the device implements the relevant functions via execution of an information widget 242, which may be a standalone application or programming which is integrated with the operating system of the mobile device 11.

Hence, the example includes a number of programs 240, including the information widget 242, stored in the flash memory 214 for execution by the microprocessor 212. While in this example the information widget 242 is discussed as a standalone application program, the information widget may also be part of the operating system of the mobile device 11. The information widget 242 may be pre-installed at the mobile device 11 by the carrier providing the mobile communications services, when the mobile device 11 is newly purchased by the user.

The execution of the information widget 242 by the microprocessor 212 enables the mobile device 11 to provide a user interface through which customized information related to the mobile device 11 such as, for example, customized advice information such as help information or tip regarding operation of the mobile device 11, is displayed. The customized information can be received from the application server 130. As discussed above, the application server 130 obtains account information for the user of the mobile device 11 from the account information database 132, and selects information stored in the information database 132 for providing to the user through the information widget 242.

In one example, the application server 130 may periodically (e.g., hourly, daily, once every week, etc.) determine a predetermined number (e.g., three) of new pieces of customized information for communicating to the mobile device 11. The time interval for determining the new pieces of customized information and/or the predetermined number may be provided by the user via a user interface provided by the information widget 242. The administrator 138 may also provide the time interval and/or the predetermined number through the admin console 136. The time interval and/or the predetermined number may also be varied based on the obtained account information or in response to user interaction with the displayed customized information (e.g., the user dismissing a piece of displayed customized information). When the application server 130 determines which pieces of information to communicate to the mobile device 11 for displaying through the information widget 242, the criteria for providing the pieces of information to the user that are specified through the admin console 136 may be considered. For example, the criteria that are specified through the admin console 136 for the different pieces of information that are stored in the information database 134 may include the intended user/mobile device for each piece of information, and/or the intended time for displaying the piece of information through the information widget 242. As one example, the criteria for displaying tip information which describes how to use a lesser-known feature about the mobile device 11 through the information widget 242 may be specified such that the information is to be displayed after the user has used/owned the mobile device 11 for six months as determined by carrier records. Based on such criteria, the application server 130 may compare against the subscriber account record for the user obtained from the account information database 132, and if the subscriber account record indicates that the user has been using the mobile device 11 for six months, the tip on the lesser-known feature is communicated to the mobile device 11 for display through the information widget.

The flash memory 214 may also include a local information database 244, which is the local information database 140 of FIG. 1. When the user newly purchases the mobile device 11, the local information database 244 may be preloaded by the carrier with default pieces of information, such as general tips for using a new mobile device. The preloaded default information is displayed through the information widget 242 at least until customized information is received from the application server 130. Also, in this example, the customized information communicated to the mobile device 11 from the application server 130 may be stored at the local information database 244 in addition to, or so as to replace the preloaded information.

The preloaded information may also include advice information such as help information or tips that relate to certain device events such as, for example, battery levels running low, or memory space at the flash memory 214 running low. The information widget 242 may determine that certain device events has occurred, and select from the local information database 244 information that correspond to the determined device event for providing to the user.

The execution of the information widget 242 by the microprocessor 212 may also enable the mobile device 11 to provide an information navigation feature, in which the user is provided with a user interface for allowing the user to search for information regarding operation of the mobile device 11 in a turn-by-turn navigation-like manner. The information navigation feature may alternatively be implemented as a separate application program. The information navigation feature will be discussed in more detail below with reference to FIG. 4.

The structure and operation of the mobile device 11 and the application server 130, as outlined above, were described to by way of example, only.

Figure 3:
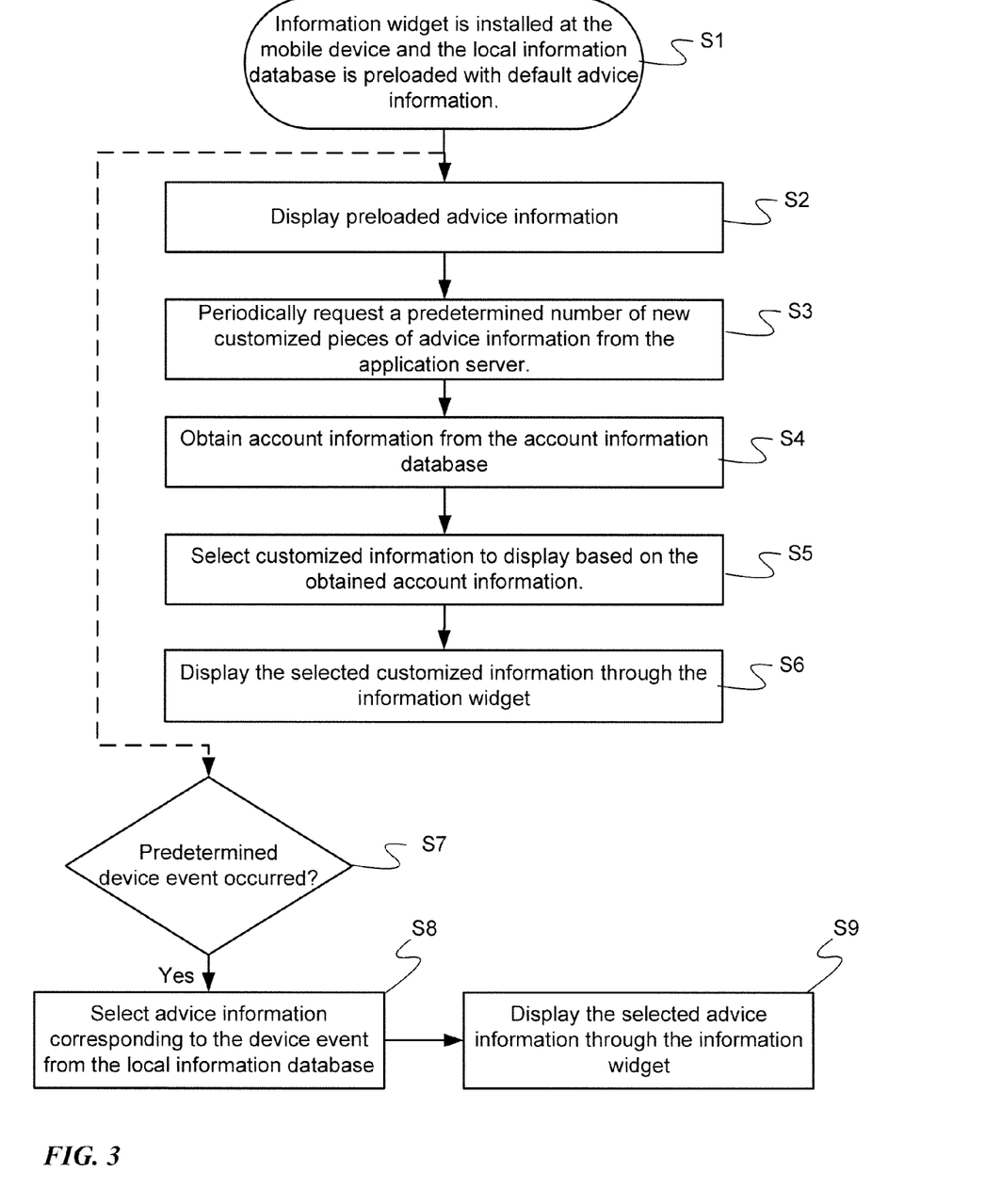
FIG. 3 is a flow chart useful in understanding a process for providing customized information regarding operation of mobile devices, to the user.

For discussion of the process flow of FIG. 3, we will assume that the information widget 242 is installed at the mobile device 11 and the local information database 244 is preloaded with advice information related to using the mobile device 11, including default help information or tips that may be helpful to the user after newly purchasing the mobile device 11 (step S1). The preloaded advice information may also include help information or tips that may be helpful in situations corresponding to various device events (e.g., battery running low or memory space at flash memory 214 running low).

At step S2, the preloaded advice information is displayed to the user. As with information stored in the information database 134, information that is preloaded in the local information database 244 may also have criteria under which the preloaded information is to be provided to the user (e.g., display when the mobile device 11 is turned on for the first time or display if battery level is falling below a predetermined level). When displaying the preloaded advice information, the information widget 242 may randomly select the pieces of preloaded information to display, or select the pieces of preloaded information based on their associated criteria. When the pieces of information are selected based on their associated criteria and if multiple pieces are associated with identical or similar criteria, a piece may be randomly selected from among all pieces which satisfy the criteria.

The information widget 242 may display multiple pieces of help information or tips at the same time. For example, at a given time, the information widget may display three pieces of "static" information, and three pieces of "dynamic" information. Static information is help information or tips that may be relevant generally to all users of mobile devices, and may be displayed through the information widget 242 for prolonged period of times (e.g, six months to two years). Dynamic information is help information or tips that may be updated more frequently and may be more specific to the user of the mobile device 11 or the mobile device 11 itself. Dynamic information may also be updated in response to mobile device events.

At step S3, the information widget 242 periodically requests new advice information from the application server 130, so as to update the advice information displayed through the information widget 242. The intervals at which new information is requested for updating may be different for static and dynamic information. For example, the requests for updating the dynamic information may made every week, whereas the request for updating the static information may be made less frequently (e.g., every month). In response to the request, the application server 130 communicates with the account information database 132 to obtain account information for an account associated with the mobile device 11 (step S4). The account information includes historical device information associated with the account such as the current mobile device model and/or previous mobile device models that is or were associated with the account, and how long the current and/or previous mobile devices has been associated with the account. The account may associate a user with the mobile device 11, and the account information may also include user preferences for the associated user. The account information may further include other account related information such as the mobile device number, payment information, information related to the contract, voice plan, data plan or any events such as workshops or conferences that the user may have attended in connection with the account and/or the mobile device 11. While in this example the user preferences are stored in the account information obtained from the account information database 132, the user preferences may also be received from the mobile device 11. The user may provide his or her user preferences through a user interface provided at the mobile device 11, for storage at the flash memory 214 of the mobile device 11. The application server 130 may obtain such user preferences from the mobile device 11, when obtaining the account information from the database 132.

Based on the obtained account information, the application server 130 selects customized pieces of information to display through the information widget 242 so as to be adapted for the account (step S5). The selection of the customized pieces of information may be made by comparing the obtained account information against the help information or tips and/or their associated criteria for displaying to the user of the mobile device 11, stored in the information database 134. For example, the administrator 138 may have entered in a tip in the information database 134 that is very specific to a certain model of mobile device, and entered in as its associated criteria that the tip is intended for the specific model and that the tip is to be displayed to the user of the mobile device 11 three times at specific intervals during the period the model is associated with the account. If the account information indicates that the mobile device 11 is the specific model specified in the criteria and the current date satisfies the interval indicated in the criteria, the tip may be selected for display to the user of the mobile device 11. The medium (e.g., text, sound, or video) in which the advice information is provided to the user may also be varied based on the account information. For example, the user preferences may indicate that the user prefers consuming information in video, rather than text. In such case, if similar information is available in both text and video, the video format will be selected for display to the user. The language in which the advice information is provided may be varied based on the user's preferred language. The user's preferred language may be determined, for example, based on the user profile of the account information, user input obtained through a user interface provided on the mobile device 11 (e.g., a device settings menu for the mobile device 11), or applications that are installed at the mobile device 11 (e.g., more than a predetermined number of applications that are installed on the mobile device 11 is in a certain language). For example, if the user's preferred language is determined to be Spanish, the advice information may be provided in Spanish.

At step S6, the customized information selected at step S5 is displayed through the information widget. In this example, the application server 130 communicates the selected customized information to the mobile device 11, and the information widget 242 provides the received customized information for display to the user. The received customized information may be stored at the local information database 244 at east until newer customized information is received for replacement.

In addition to periodically requesting for customized advice information, the information widget also determines whether a predetermined device event has occurred (step S7). Such a device event may be, for example, a battery (or drain rate) falling below a predetermined percentage, a free memory space at the flash memory 214 falling below a predetermined percentage, or a mobile wireless communication signal falling below one or more predetermined levels. A device log may be maintained by the operating system of the mobile device 11 which records all device events occurring as a result of the mobile device operation. Such device log may be stored at the flash memory 214, and the information widget may monitor the device log to determine whether a predetermined device event has occurred.

If an occurrence of a predetermined device event is determined by monitoring the device log or by otherwise by being notified of the device event, the help information or tip that corresponds to the determined device event is selected from the local information database 244 (step S8). The preloaded information that is stored in the local information database 244 may also store criteria for displaying the various pieces of preloaded information. Such criteria may include whether a piece of preloaded information is intended to be displayed in response to an occurrence of a specific device event. For example, one such criteria for a tip for conserving battery indicated that the tip is intended to be displayed when the battery level falls below 20%. As another example, a tip for freeing up memory space may have as its criteria that the tip is to be displayed when free memory space at the flash memory 214 falls below 25%. By comparing the determined device event against such criteria stored in the local information database 244, the information widget may select the advice information corresponding to the determined device event.

At step S9, the selected advice information corresponding to the determined device event is displayed through the information widget 242. Such advice information corresponding to the device event may be displayed until the device event that triggered the display of the advice information is resolved, or until the user has dismissed or otherwise indicated that he or she no longer wishes the advice information to be displayed through the information widget. For example, a button (e.g., a button with the symbol "X" on its face) or a link (e.g., link indicating "do not show this again") may be provided adjacent to the displayed advice information through which the user may dismiss the displayed advice information by tapping on the button or link.

In the above example described with respect to FIG. 3 the information widget 242 periodically requests new customized advice information for displaying through the information widget 242. However, the above example is just one example, and the customized advice information may be communicated to the mobile device 11 and/or selected from the local database 244 in response to other types of triggers (e.g., a manual request made by the administrator 138, the application server 130 being configured to communicate customized help information or tips according to predetermined logic, or in response to user activity with respect to using applications that are downloaded and/or installed at the mobile device 11). For example, the information widget 242 may monitor the applications that are being downloaded at the mobile device 11, and select and display customized help information that corresponds to an application that has been recently downloaded. The information widget 242 may also monitor the usage of the applications installed at the mobile device 11, and select and display customized help information based on the user activating or using a feature of an application for the first time (e.g., displaying help information related to an advanced settings menu of an application in response to the user accessing the advanced settings menu for the first time). In another example, the application server 130 may determine that the user has downloaded a new application at his or her mobile device 11 by monitoring the account information at the account information database 132, and in response communicate customized help information to the mobile device 11 for display via the information widget 242.

In another example, the pieces of advice information that are provided for display through the information widget 242 may be randomly selected from all available advice information in the information database 134 and/or the local information database 140. For example, when the information widget 242 requests a new piece of advice information as in step S3 described above, a piece of advice information may be randomly selected and transmitted to the mobile device 11, rather than being selected based on the account information. Alternatively, the advice information may be selected sequentially in a predetermined order. In this example, the frequency of updating the randomly selected piece of advice information or selecting the next piece in the predetermined sequence, or whether the advice information is preloaded and selected from the local information database 140 or obtained from the information database 134, may be based on the account information obtained from the account information database 132 and/or user activity with respect to the operation of the mobile device 11. For example, if the user dismisses the displayed piece of advice information as soon as the piece is updated, the frequency of updating the advice information may become higher.

In yet another example, the information widget 242 may display pieces of advice information corresponding to a predetermined set of categories, and the pieces of advice information for display within each category may be selected randomly or sequentially in predetermined orders. For example, the information widget 242 may display one piece of advice information for each category of advice information that relates to generally to all users, the specific model of the mobile device 11, and the most recent application that the user has downloaded. For each category, a piece of advice information may be randomly selected from among all pieces of advice information that fall under the category and be provided for display through the information widget 242. In this example, the type and number of the advice information categories, the frequency of updating the pieces of advice information in each category, or whether the advice information is preloaded and selected from the local information database 140 or obtained from the information database 134, may be based on the account information obtained from the account information database 132 and/or user activity with respect to the operation of the mobile device 11. For example, if the user of the mobile device has not downloaded a new application for more than a predetermined period of time period, then the category of advice information related to the most recently download application may be removed or replaced with other type of category.

Figure 4:
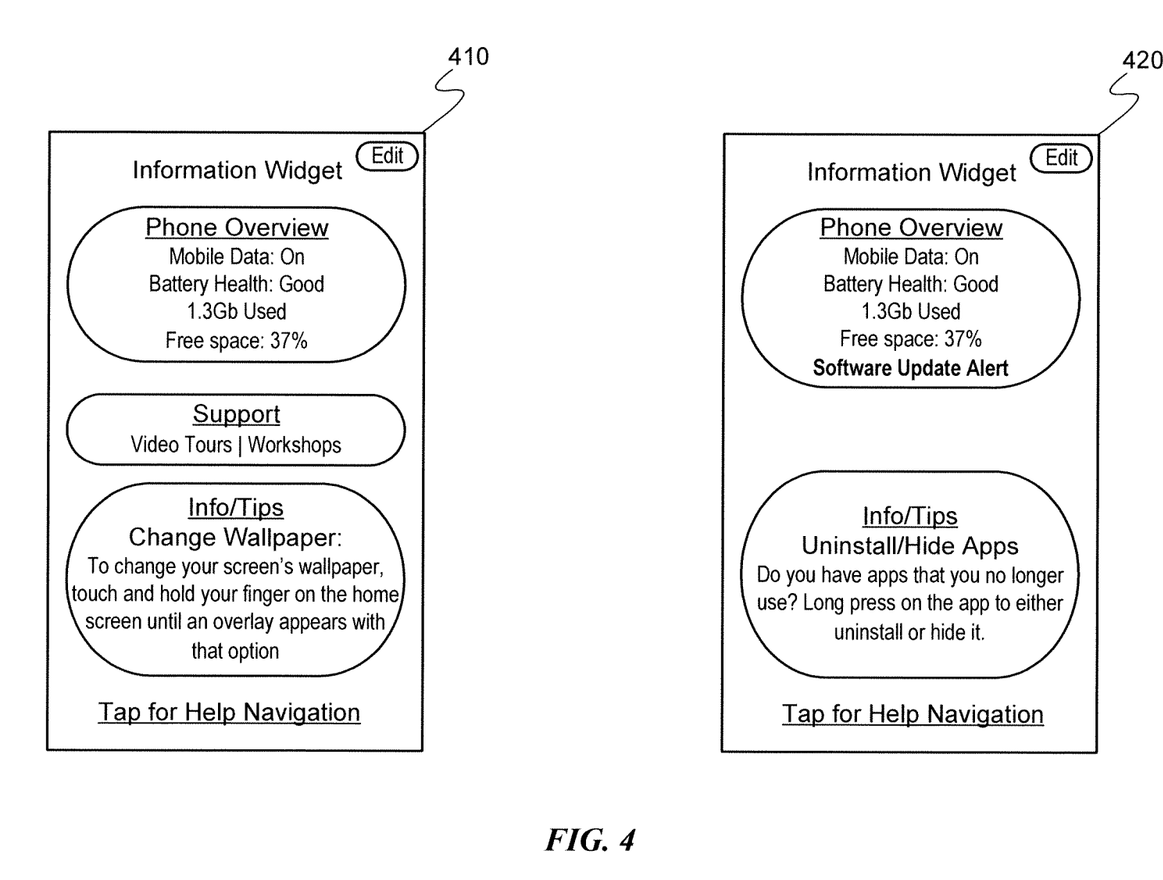
FIG. 4 illustrates exemplary user interfaces provided by an information widget.

FIG. 4 illustrates exemplary user interfaces 410 and 420 of the information widget 242. The drawing shows the user interface 410 of the information widget 242 that is displayed to a user of the mobile device 11 shortly after the device 11 has been associated with an account for a subscription to data service through the network 110. The user interface 410 includes a Phone Overview section with basic information regarding mobile device 11, including information regarding device events (battery status or storage space at the flash memory 214) and other device configurations such as whether data service is enabled. The Phone Overview section may also include a part of the account information, such as amount of data used.

The user interface 410 also includes a Support section with links help information such as video tours providing video overviews of various features available at the mobile device 11 and information on workshops regarding operation of the mobile device 11 that the user may attend. The user interface 410 further includes an Info/Tips section displaying customized advice information (e.g., help information or tips) regarding operation of the mobile device 11. In this example, the drawing shows that a tip teaching the user about a basic functionality (e.g., how to change the phone's wallpaper) of the mobile device 11 is displayed in the Info/Tips section. The user interface 410 also displays an edit button. If the user wants to edit the information widget 242, he or she can click on the edit button to resize the user interface 410, or add or remove sections in the user interface 410.

The drawing also shows the user interface 420 of the information widget 242 that is displayed to the user after the mobile device 11 has been associated with the account for a year. The user interface 420 still includes the Phone Overview section, but the drawing in this example shows that the Phone Overview section now alerts the user that a new software update is available for the information widget 242. The drawing shows that the user interface 420 no longer includes the Support section because the user has already watched the Video Tours and has attended a workshop. The advice information shown in the Info/Tips section also has changed with more advanced tips such as how to uninstall/hide apps.

Figure 5:
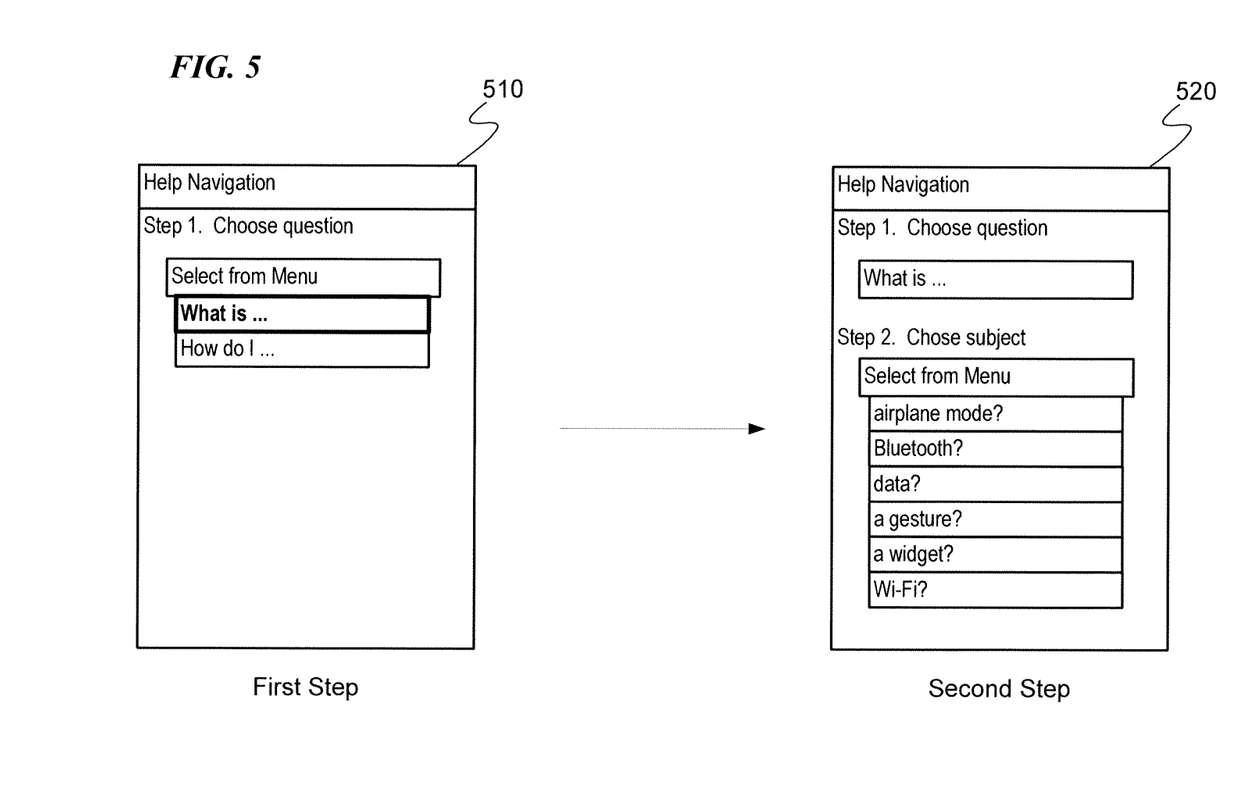
FIG. 5 is a diagram useful in understanding the operations related to allowing the user to search for information regarding operation of mobile devices.

The information widget 242 may also provide an information navigation feature which provides a user interface through which the user may search for and view advice information (e.g., help or tip information) regarding the operation of the mobile device 11. In this example, the user interfaces 410 and 420 also include a link for accessing the help navigation feature. The user may tap on the link, and in response to the user's tapping on the link the information widget 242 may provide user interfaces as will be described with reference to FIG. 5 below for providing the help navigation feature to the user. Alternatively, tapping on the link may cause the information widget 242 to execute a separate application for the help navigation feature. In another example, tapping anywhere on the Info/Tips section, in addition to or alternative to tapping on the link, may provide the user interface or execute the separate application for providing the help navigation feature. FIG. 5 is a diagram which helps understand the operations related to the information navigation feature.

The information navigation feature allows the user to compose a search query for advice information (e.g., help information or tips) in a step-by-step navigation style. Composing the search query is performed in multiple steps. At each step, the user is provided a list of terms or phrases from which to compose the search query. Based on the selection made on the previous step, the pieces of the search query for selection in the next step is populated. Such steps are performed for multiple steps until the search query is completed.

The drawing shows an example user interface 510 for a first step in composing a search query. The user interface 510 shows a drop down menu from which the user may select from a list of first pieces of search queries corresponding to different types of questions, including "What is . . . ," and "How do I . . . ." After the user selects a question type in the first step, the information navigation feature provides a second user interface 520 for a second step in composing the search query. The drawing shows that the user has selected the question type "What is . . . " in the first step, and the user interface 520 shows that list of second piece of search queries is populated based on the selection of the first piece of search query in the first step. Specifically, the user interface 520 shows the various subjects such as "airplane mode," "Bluetooth," or "data" that may be composed with the question type selected in the first step to form a complete search query. In the second step, the user may select a desired second piece of the search query from the list displayed in the user interface 420, to complete composing the search query.

After completing the search query, the advice information corresponding to the composed search query is selected from an information database such as the local information database 244 or the information database 134, and is displayed to the user. While the drawing shows that the search query is composed in two steps, more than two steps may be used for composing the search query. The number of steps for composing the search query may also vary depending on the selections made by the user at each step. For example, as shown in the user interfaces 510 and 520, it took two steps for the user to compose a query when the user selected the question type "What is . . . " in the first step. However, it may take three steps to compose the search query if the user selects "How do I . . . " in the first step. In such case, the user may be provided with a list of verbs such as "access," "turn on." or "turn off" that corresponds to "how do I . . . " in the second step, and select the various subjects such as "airplane mode" or "Bluetooth" which may complete the search query, in the third step.

The pieces of the search query provided for display to the user for the user's selection at each step of composing the search query may also be determined based on the account information for the account associated with the mobile device 11, obtained from the account information database 132. For example, after the user has selected the question type "What is . . . " at the user interface 510, if the account information indicates that the mobile device 11 does not include Wifi, the list provided in the user interface 520 for the second step would not contain a second piece of search query corresponding to "Wifi."

In one example, the pieces of the search query for user selection at the various steps of composition and the advice information corresponding to the possible search queries which may be composed from such pieces may be preloaded in the local information database 244. Therefore, the user may quickly search for information that he or she is looking for using the information navigation feature, even if the mobile device is off-line (e.g., not connected to the network 110 or the Internet 120).

In this example, the information widget 242 may periodically request updates to the list of search query pieces and the corresponding advice information, from the application server 130. In response to such requests, the application server 130 may select the list of search query pieces and the corresponding advice information based on the account information of the account associated with the mobile device, and communicate the selected list of search queries and the corresponding advice information to the mobile device. The selected list and the corresponding advice information may be stored at the local information database 244 so as to update the preloaded list and the corresponding advice information. Therefore, next time the user utilizes the help navigation feature, the information widget 242 may display to the user the list of search query pieces that may be more relevant to the user and/or the mobile device, thereby allowing the user to compose a search query and that the user is seeking in a more efficient manner.

The order in which the pieces are displayed in the list of search query pieces may also be determined based on user activity. For example, the account information may also store information related to user activity, such as the history of search query pieces that the user has previously selected. Based on such information on user activity, when displaying the list of search query pieces, the information widget 242 may display the search query piece that the user has selected most recently at the top, and the least recently selected piece at the bottom. The order in which the search query pieces are displayed in the list may also be organized according to device events. For example, if an application is currently open at the mobile device 11, the search query piece that corresponds to the application may be displayed at the top of the list.

In the above example described with respect to FIG. 5 the information widget periodically requests updates to the list of search query pieces and the corresponding advice information from the application server 130. However, the above example is just one example, and the list of search query pieces and the corresponding advice information may be updated in response to other types of triggers, such as, for example, manual request made by the administrator 138 or the application server 130 being configured to communicate the updates according to predetermined logic. Further, the help navigation feature may be implemented as an application program that is separate from the information widget.

As shown by the above discussion, functions relating to providing customized information to the user and/or allowing the user to search for information regarding operation of mobile devices as shown in FIGS. 3-5 may be implemented using executable programming on an appropriate mobile device and in at least some cases may involve communication with servers or the like connected for data communication via the components of a data network, such as the application server 130 and/or the databases 132 and 134 as shown in FIG. 1. In addition to the functions related to providing customized information to the user and allowing the user to search for information regarding operation of mobile devices supported by the server(s) or database(s) in the specific examples of FIGS. 3 and 4, the same or other server(s) or database(s) may support downloading of original or upgrade versions of the relevant programming (e.g., information widget 242) for the mobile device 11, through a network to install the programming in the device 11. Although special purpose devices may be used for any of these server or database functions, such servers or databases also may be implemented using one or more hardware platforms intended to represent a general class of data processing device commonly used to run "server" programming so as to implement the respective functions discussed above, albeit with an appropriate network connection for data communication.

Figures 6, 7:
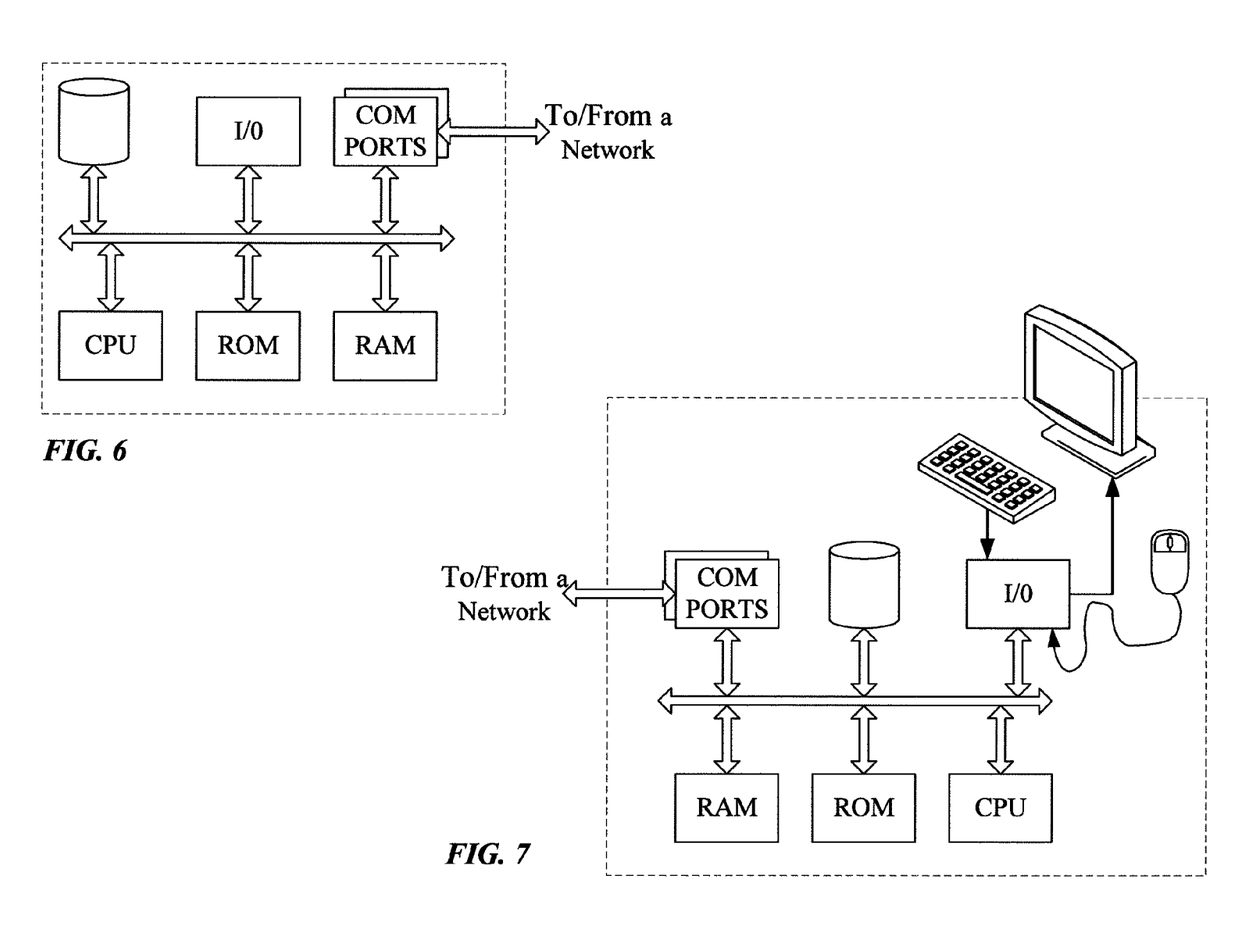
FIG. 6 is a simplified functional block diagram of a computer that may be configured as a host or server, for example, to function as the application server in the system of FIG. 1.
FIG. 7 is a simplified functional block diagram of a personal computer or other work station or terminal device.

FIGS. 6 and 7 provide functional block diagram illustrations of general purpose computer hardware platforms. FIG. 6 illustrates a network or host computer platform, as may typically be used to implement a server. FIG. 7 depicts a computer with user interface elements, as may be used to implement a personal computer or other type of work station or terminal device, although the computer of FIG. 7 may also act as a server if appropriately programmed. It is believed the structure, programming and general operation of such computer equipment should be self-explanatory from the illustrations.

The software functionalities involve programming, including executable code as well as associated stored data, e.g. executable code and associated data files used for the information widget 242. The software code is executable by the microprocessor 212 or other programmable processor of the mobile device 11, although as noted, at times, such software may be stored in another computer platform and downloaded through a network for installation in the mobile device 11. Execution of such code by a processor of the mobile device 11 enables the device 11 to implement the methodology for obtaining user inputs relating to providing customized information to the user and allowing the user to search for information regarding operation of mobile devices, and performing operations for providing customized information to the user and allowing the user to search for information regarding operation of mobile devices, in essentially the manner performed in the implementations discussed and illustrated herein.

Hence, aspects of the methods of providing customized information to the user and allowing the user to search for information regarding operation of mobile devices and related action processing outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of a merchant or an application store into the mobile terminal of the customer/user. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising steps of:
obtaining account information, through a mobile wireless communication network, from a database of subscriber account records for a plurality of subscribers of a service providing mobile wireless communication to mobile devices of the subscribers, for an account of a first subscriber associated with one of the mobile devices, wherein the obtained account information comprises historical device information associated with the account;
determining, from the historical device information, a length of use time period that the first subscriber of the one mobile device has been using the one mobile device to thereby become familiar with operation of the one mobile device from the historical device information, wherein the determined length of use time period is how long the one mobile device has been associated with the account of the first subscriber on the mobile wireless communication network as determined by carrier records;
comparing the determined length of use time period with a predetermined usage period that specifies a length of time of mobile device use;
upon finding the determined length of use time period that the first subscriber has been using the one mobile device exceeds the predetermined usage period:
selecting, for the one mobile device based on the obtained account information, a first advice information regarding a lesser-known feature for operation of the one mobile device in comparison to other advice information regarding a greater-known feature for operation of the one mobile device from a first database of advice regarding operation of the mobile devices, wherein the lesser-known feature is determined by carrier records to require a greater length of time of mobile device use before being presented to the first subscriber of the one mobile device than the greater-known feature; and
providing the selected first advice information via at least one user interface element of the one mobile device.

2. The method of claim 1, wherein:
the step of obtaining the account information comprises selecting the account information at a server in communication with the one mobile device via the mobile wireless communication network, and
the method further comprises receiving the selected advice information at the one mobile device via the mobile wireless communication network.

3. The method of claim 2, further comprising requesting, by the one mobile device, the account information from the server, wherein the step of selecting the account information comprises selecting the account information in response to the request.

4. The method of claim 3, wherein the requesting step comprises at least one of periodically requesting the account information and requesting the account information in response to a device event.

5. The method of claim 1, wherein:
the first database of advice stores criteria for providing first advice information via the at least one user interface element of the one mobile device, wherein the criteria identifies a condition related to at least one of a time and the historical device information associated with the account, for providing the first advice information via the at least one user interface element of the mobile device, and the step of selecting the first advice information comprises selecting the first advice information further based on the criteria for providing the first advice information via the at least one user interface element of the one mobile device.

6. The method of claim 1, further comprising:

selecting first search related phrases for obtaining second advice information for the one mobile device based on the obtained account information;

providing second advice information obtained based at least in part on the first search related phrases via at least one user interface element of the one mobile device;

determining a first device event and a second device event have occurred, the first and second device events associated with the one mobile device, wherein the first device event is a battery of the first mobile device reaching below a predetermined level and the second device event is flash memory space of the first mobile device reaching below a certain level;

responsive to the first device event associated with the one mobile device of the battery of the first mobile device reaching below the predetermined level, selecting third advice information from a local database of advice regarding device events associated with the one mobile device such that the selected third advice information is adapted for the first device event, wherein the local database of advice is stored in a memory of the one mobile device;

responsive to the second device event associated with the one mobile device of the flash memory space of the first mobile device reaching below the certain level selectins fourth advice information from the local database of advice regarding device events associated with the one mobile device such that the selected fourth advice information is adapted for the second device event; and providing the selected third advice information and the selected fourth advice information to the user via the at least one user interface element of the one mobile device.

7. The method of claim 6, wherein the local database of advice includes preloaded advice regarding device events of the one mobile device.

8. The method of claim 1, wherein the historical device information identifies at least one of a previous mobile device and the one mobile device.

9. The method of claim 1, further comprising:

presenting a first level menu of first search related phrases via at least one user interface element of the one mobile device, to a user of the one mobile device;

receiving a selection by the user of one of the first search related phrases in the one mobile device;

selecting second search related phrases based at least on the one first search related phrase selected by the user;

presenting a second level menu of the second search related phrases, via the at least one user interface element of the one mobile device, to the user;

receiving a selection by the user of one of the second search related phrases in the one mobile device;

combining the one first search related phrase and the one second search related phrase to form a search query; and obtaining second advice information based on the search query;

wherein the step of providing comprises providing the second advice information obtained based on the search query via the at least one user interface element of the one mobile device.

10. The method of claim 1, further comprising:

logging, in a device log in a flash memory of the one mobile device, device events occurring as a result of operation of the one mobile device;

monitoring the device log by comparing the device events against a predetermined device event; and upon determining one of the device events matches a predetermined device event, displaying a tip for handling the predetermined device event via the at least one user interface element.

11. A non-transitory computer readable medium having stored thereon a program, wherein execution of the program of the non-transitory computer readable medium configures a mobile device to perform functions, including functions to:

obtain account information via the transceiver, through a mobile wireless communication network from a database of subscriber account records for a plurality of subscribers of a service providing mobile wireless communication to mobile devices including the mobile device, for an account of a first subscriber associated with the mobile device, wherein the obtained account information comprises historical device information associated with the account;

determine, from the historical device information, a length of use time period that the first subscriber of the one mobile device has been using the one mobile device to thereby become familiar with operation of the one mobile device from the historical device information, wherein the determined length of use time period is how long the one mobile device has been associated with the account of the first subscriber on the mobile wireless communication network as determined by carrier records;

compare the determined length of use time period with a predetermined usage period that specifies a length of time of mobile device use;

upon finding the determined length of use time period that the first subscriber has been using the one mobile device exceeds the predetermined usage period:

select, for the mobile device based on the obtained account information, a first advice information regarding a lesser-known feature for operation of the one mobile device in comparison to other advice information regarding a greater-known feature for operation of the one mobile device from a first database of advice regarding operation of the mobile device, wherein the lesser-known feature is determined by carrier records to require a greater length of time of mobile device use before being presented to the first subscriber of the one mobile device than the greater-known feature; and provide the selected first advice information via at least one user interface element of the mobile device.

12. The non-transitory computer readable medium of claim 11, wherein:

the function to obtain the account information comprises a function to select the account information at a server in communication with the mobile device via the mobile wireless communication network, and the program further configures the mobile device to perform a function to receive the selected advice information at the mobile device via the mobile wireless communication network.

13. The non-transitory computer readable medium of claim 12, wherein:

the program further configures the mobile device to perform a function to request, by the mobile device, the account information from the server, and the function to select the account information comprises a function to select the account information in response to the request.

14. The non-transitory computer readable medium of claim 13, wherein the function to request comprises at least one of a function to periodically request the account information and a function to request the account information in response to a device event.

15. The non-transitory computer readable medium of claim 11, wherein:

the first database of advice stores criteria for providing first advice information via the at least one user interface element of the mobile device, wherein the criteria identifies a condition related to at least one of a time and the historical device information associated with the account, for providing the first advice information via the at least one user interface element of the mobile device, and the function to select the first advice information comprises a function to select the first advice information further based on the criteria for providing the first advice information via the at least one user interface element of the mobile device.

16. The non-transitory computer readable medium of claim 11, wherein the program further configures the mobile device to perform functions to:

select first search related phrases for obtaining second advice information for the one mobile device based on the obtained account information;

provide second advice information obtained based at least in part on the first search related phrases via at least one user interface element of the one mobile device;

determine a first device event and a second device event have occurred, the first and second device events associated with the one mobile device, wherein the first device event is a battery of the first mobile device reaching below a predetermined level and the second device event is flash memory space of the first mobile device reaching below a certain level;

responsive to the first device event associated with the mobile device of the battery of the first mobile device reaching below the predetermined level, select third advice information from a local database of advice regarding device events associated with the mobile device such that the selected third advice information is adapted for the first device event associated with the mobile device, wherein the local database of advice is stored in a memory of the mobile device;

responsive to the second device event associated with the one mobile device of the flash memory space of the first mobile device reaching below the certain level, select fourth advice information from the local database of advice regarding device events associated with the one mobile device such that the selected fourth advice information is adapted for the second device event; and provide the selected third advice information and the selected fourth advice information to the user via the at least one user interface element of the mobile device.

17. The non-transitory computer readable medium of claim 16, wherein the local database of advice includes preloaded advice regarding the device events associated with the mobile device.

18. The non-transitory computer readable medium of claim 11, wherein the historical device information identifies at least one of a previous mobile device and the one mobile device.

19. The non-transitory computer readable medium of claim 11, wherein the program further configures the mobile device to perform functions to:

present a first level menu of first search related phrases via at least one user interface element of the one mobile device, to a user of the one mobile device;

receive a selection by the user of one of the first search related phrases in the mobile device;

select second search related phrases based at least on the one first search related phrase selected by the user;

present a second level menu of the second search related phrases, via the at least one user interface element of the mobile device, to the user;

receive a selection by the user of one of the second search related phrases in the mobile device;

combine the first search related phrase and the second search related phrase to form a search query; and obtain second advice information based on the search query;

wherein the function to provide comprises a function to provide the second advice information obtained based on the search query via the at least one user interface element of the one mobile device.

20. The non-transitory computer readable medium of claim 11, wherein the program further configures the mobile device to perform functions to:

log, in a device log in a flash memory of the mobile device, device events occurring as a result of operation of the mobile device;

monitor the device log by comparing the device events against a predetermined device event; and upon determining one of the device events matches a predetermined device event, display a tip for handling the predetermined device event via the at least one user interface element.

* * * * *